United States Patent
Avergun et al.

(10) Patent No.: US 7,574,569 B2
(45) Date of Patent: Aug. 11, 2009

(54) METHOD AND SYSTEM FOR TIME-WEIGHTED HISTORY BLOCK MANAGEMENT

(75) Inventors: Mikhail Avergun, San Diego, CA (US); Yevgeny V. Naryzhny, Newport Beach, CA (US)

(73) Assignee: Invensys Systems, Inc., Foxboro, MA (US)

( * ) Notice: Subject to any disclaimer, the term of this patent is extended or adjusted under 35 U.S.C. 154(b) by 230 days.

(21) Appl. No.: 11/189,651

(22) Filed: Jul. 26, 2005

(65) Prior Publication Data
US 2007/0028070 A1    Feb. 1, 2007

(51) Int. Cl.
*G06F 12/02*    (2006.01)
(52) U.S. Cl. .................................... 711/154
(58) Field of Classification Search .................. 711/154
See application file for complete search history.

(56) References Cited

U.S. PATENT DOCUMENTS 6,725,241 B1 * 4/2004 Rodriguez et al. .......... 707/203
2002/0087822 A1 * 7/2002 Butterworth ................ 711/170
2006/0004689 A1 * 1/2006 Chandrasekaran et al. ..... 707/1

OTHER PUBLICATIONS

International Search Report for PCT/US06/28303 dated Sep. 28, 2007.
Written Opinion for PCT/US06/28303 dated Sep. 28, 2007.

* cited by examiner

*Primary Examiner*—Hyung S Sough
*Assistant Examiner*—Hamdy S Ahmed
(74) *Attorney, Agent, or Firm*—Leydig, Voit & Mayer Ltd.

(57) ABSTRACT

Disclosed is a technique for managing items in a memory store. A "free-space size threshold" is set for the memory store. An age parameter is also set. When the amount of free space in the store decreases below the threshold, space in the store is freed up by removing memory items. Memory items older than specified by the age parameter are also removed. A "chain" of memory stores can be implemented. When a memory item is removed from the first store, it is added to the second store and so on. The techniques of the present invention can be implemented in each store in the chain, or the stores can use different memory management techniques.

17 Claims, 6 Drawing Sheets

METHOD AND SYSTEM FOR TIME-WEIGHTED HISTORY BLOCK MANAGEMENT

TECHNICAL FIELD

The present invention generally relates to computing and networked data storage systems, and, more particularly, to techniques for managing (e.g., storing, retrieving, processing, etc.) streams of supervisory control, manufacturing, and production information. Such information is typically rendered and stored in the context of supervising automated processes.

BACKGROUND OF THE INVENTION

Industry increasingly depends upon highly automated data acquisition and control systems to ensure that industrial processes are run efficiently and reliably while lowering the overall production costs. Data acquisition begins when a number of sensors measure aspects of an industrial process and report their measurements back to a data collection and control system. Such measurements come in a wide variety of forms. By way of example the measurements produced by a sensor include: a temperature, a pressure, a pH, a mass or volume flow of material, a counter of items passing through a particular machine or process, a tallied inventory of packages waiting in a shipping line, cycle completions, a photograph of a room in a factory, etc. Often sophisticated process management and control software examines the incoming data associated with an industrial process, produces status reports and operation summaries, and, in many cases, responds to events and to operator instructions by sending commands to controllers that modify operation of at least a portion of the industrial process. The data produced by the sensors also allow an operator to perform a number of supervisory tasks including: tailoring the process (e.g., specifying new setpoints) in response to varying external conditions (including costs of raw materials), detecting an inefficient/non-optimal operating condition or impending equipment failure, and taking remedial action such as moving equipment into and out of service as required.

A simple and familiar example of a data acquisition and control system is a thermostat-controlled home heating and air conditioning system. A thermometer measures a current temperature; the measurement is compared with a desired temperature range; and, if necessary, commands are sent to a furnace or cooling unit to achieve a desired temperature. Furthermore, a user can program or manually set the controller to have particular setpoint temperatures at certain time intervals of the day.

Typical industrial processes are substantially more complex than the above described simple thermostat example. In fact, it is not unheard of to have thousands or even tens of thousands of sensors and control elements (e.g., valve actuators) monitoring and controlling all aspects of a multi-stage process within an industrial plant. The amount of data sent for each measurement and the frequency of the measurements varies from sensor to sensor in a system. For accuracy and to facilitate quick notice and response of plant events and upset conditions, some of these sensors update and transmit their measurements several times every second. When multiplied by thousands of sensors and control elements, the volume of data generated by a plant's supervisory process control and plant information system can be very large.

Specialized process control and manufacturing and production information data storage facilities (also referred to as plant historians) have been developed to handle the potentially massive amounts of production information generated by the aforementioned systems. An example of such a system is the WONDERWARE IndustrialSQL Server historian. A data acquisition service associated with the historian collects time-series data from a variety of data sources (e.g., data access servers). The collected data are thereafter deposited with the historian to achieve data access efficiency and querying benefits and capabilities of the historian's relational database. Through its relational database, the historian integrates plant data with event, summary, production, and configuration information.

Traditionally, plant historians have collected and archived streams of raw data representing process, plant, and production status over the course of time. The status data are of value for purposes of maintaining a record of plant performance and for presenting and recreating the state of a process or plant equipment at a particular point in time. However, individual pieces of data taken at single points in time are often insufficient to discern whether an industrial process is operating properly or optimally. Further processing of the raw data often renders more useful information for operator decision making.

Over the years vast improvements have occurred with regard to networks, data storage and processor device capacity, and processing speeds. Notwithstanding such improvements, supervisory process control and manufacturing information system designs encounter a need to either increase system capacity and speed or to forgo saving certain types of information derived from raw data because creating and maintaining the information on a full-time basis draws too heavily from available storage and processor resources. Thus, while valuable, certain types of process information are potentially not available in certain environments. Such choices can arise, for example, in large production systems where processing raw data to render secondary information is potentially of greatest value.

SUMMARY OF THE INVENTION

In view of the foregoing, the present invention provides a technique for managing items in a memory store. A "freespace size threshold" is set for the memory store. An age parameter is also set. When the amount of free space in the store decreases below the threshold, space in the store is freed up by removing memory items. Memory items older than specified by the age parameter are also removed.

A "chain" of memory stores can be implemented. When a memory item is removed from the first store, it is added to the second store and so on. The techniques of the present invention can be implemented in each store in the chain, or the stores can use different memory management techniques.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

As noted previously in the background, a plant information historian service maintains a database comprising a wide variety of plant status information. The raw plant status information, when provided to operations managers in its unprocessed form, offers limited comparative information such as how a process or the operation of plant equipment has changed over time. In many cases, performing additional analysis on raw data streams to render secondary information greatly enhances the information value of the raw data. In embodiments of the invention, such analysis is delayed until a client requests such secondary information from the historian service for a particular timeframe. As such, limited historian memory and processor resources are only allocated to the extent that a client of the historian service has requested the secondary information. In particular, the historian service supports a set of advanced data retrieval operations wherein raw data are processed to render particular types of secondary information "on demand" and in response to "client requests."

The terms "client requests" and "on demand" are intended to be broadly defined. The plant historian service embodying the present invention does not distinguish between requests arising from human users and requests originating from automated processes. Thus, a "client request," unless specifically noted, includes requests initiated by human/machine interface users and requests initiated by automated client processes. The automated client processes potentially include processes running on the same node as the historian service. The automated client processes request the secondary information and thereafter provide the received secondary information, in a service role, to others. Furthermore, the definition of "on demand" is intended to include both providing secondary information in response to specific requests as well as in accordance with a previously established subscription. By performing the calculations to render the secondary information on demand, rather than calculating (and tabling) the information without regard to whether it will ever be requested by a client, the historian system embodying the present invention is better suited to support a very broad and extensible set of secondary information types meeting diverse needs of a broad variety of historian service clients.

In an embodiment of the present invention, the historian service supports a variety of advanced retrieval operations for calculating and providing, on demand, a variety of secondary information types from raw data previously stored in the historian database. Among others, the historian service specifically includes the following advanced data retrieval operations: "time-in-state," "counter," "engineering units-based integral," and "derivative." "Time-in-state" calculations render statistical information relating to an amount of time spent in specified states. Such states are represented, for example, by identified tag/value combinations. By way of example, the time-in-state statistics include, for a specified time span and tagged state value: total amount of time in the state, percentage of time in the state, the shortest time in the state, and the longest time in the state.

Figure 1:
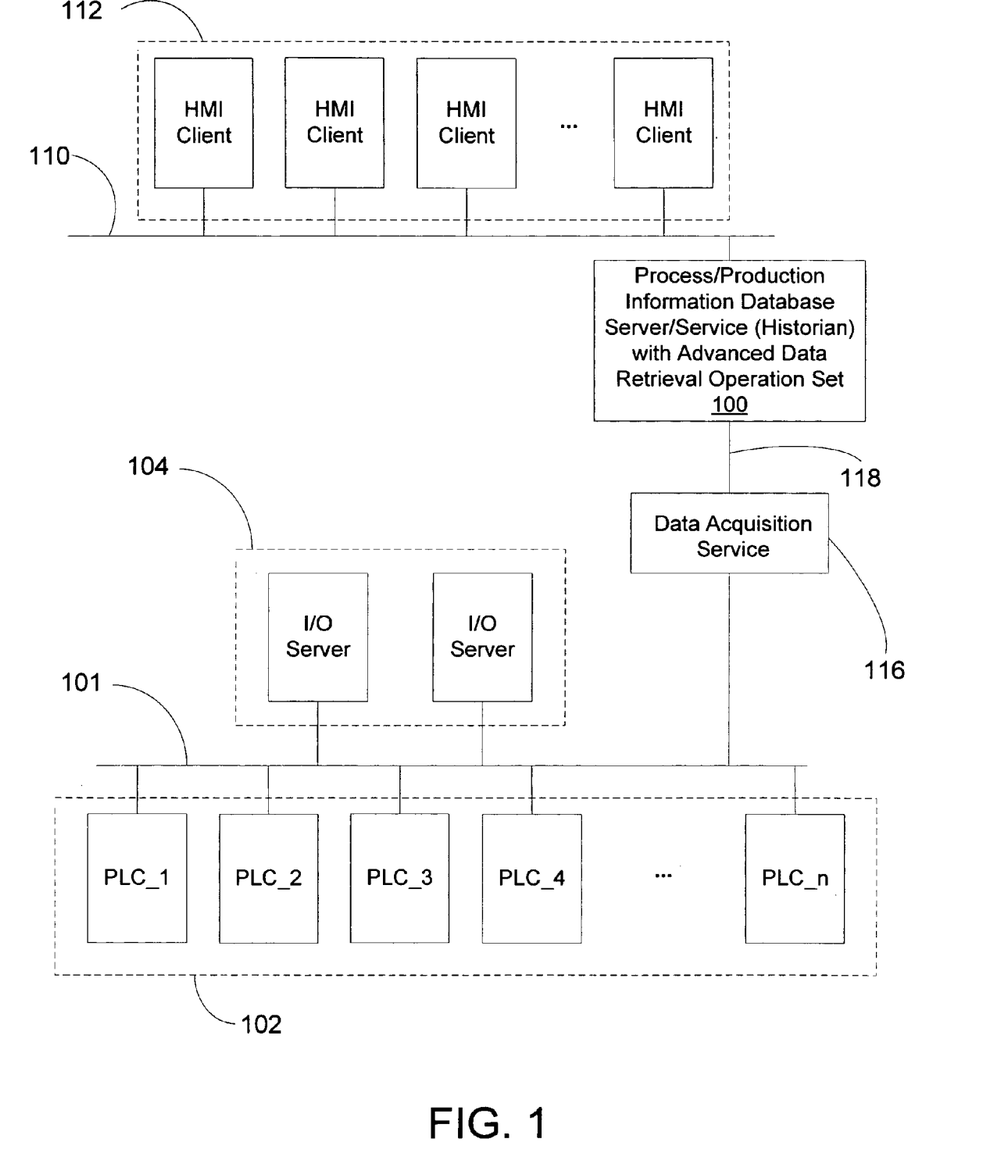
FIG. 1 is a schematic diagram of an exemplary networked environment wherein a process control database server embodying the present invention is advantageously incorporated.

The following description is based on illustrative embodiments of the invention and should not be taken as limiting the invention with regard to alternative embodiments that are not explicitly described herein. Those skilled in the art will readily appreciate that the example of FIG. 1 represents a simplified configuration used for illustrative purposes. In many cases, the systems within which the present invention is incorporated are substantially larger. The volume of information handled by a historian in such a system would generally preclude pre-calculating and storing every type of information potentially needed by clients of the historian.

FIG. 1 depicts an illustrative environment wherein a supervisory process control and manufacturing/production information data storage facility (also referred to as a plant historian) 100 embodying the present invention is potentially incorporated. The network environment includes a plant floor network 101 to which a set of process control and manufacturing information data sources 102 are connected either directly or indirectly (via any of a variety of networked devices including concentrators, gateways, integrators, interfaces, etc.). The data sources 102 comprise, for example, programmable logic controllers (PLCs) that are coupled to, communicate with, and control a variety of devices such as plant floor equipment, sensors, and actuators. Alternatively, at least some of the data could come from a distributed control system (DCS). PLCs generally provide discrete data such as states, counters, and events. DCSs often provide analog process data (e.g., temperatures, tank levels, volume flow) that facilitate real-time control of industrial processes. In both cases, the data arise from a monitored control environment. A set of I/O (input/output) servers 104 (also referred to herein as data access servers) acquire data from the data sources 102 via the plant floor network 101.

The exemplary network environment includes a production network 110. In the illustrative embodiment the production network 110 comprises a set of human/machine interface (HMI) nodes 112 that execute plant floor visualization applications supported, for example, by Wonderware's INTOUCH visualization application management software. The data driving the visualization applications on the HMI nodes 112 are acquired, by way of example, from the plant historian 100 that also resides on the production network 110. The historian 100 includes services for maintaining and providing a variety of plant, process, and production information including historical plant status, configuration, event, and summary information.

A data acquisition service 116, interposed between the I/O servers 104 and the plant historian 100, operates to maintain a continuous, up-to-date, flow of streaming plant data between the data sources 102 and the historian 100 for plant/production supervisors (both human and automated). The data acquisition service 116 acquires and integrates data (potentially in a variety of forms associated with various protocols) from a variety of sources into a plant information database, including time-stamped data entries, incorporated within the historian 100.

The physical connection between the data acquisition service 116 and the I/O servers 104 can take any of a number of forms. For example, the data acquisition service 116 and the I/O servers can be distinct nodes on the same network (e.g., the plant floor network 110). However, in alternative embodiments the I/O servers 104 communicate with the data acquisition service 116 via a network link that is separate and distinct from the plant floor network 101. In an illustrative example, the physical network links between the I/O servers 104 and the data acquisition service 116 comprise local area network links (e.g., Ethernet) that are generally fast, reliable, and stable and thus do not typically constitute a data-stream bottleneck or source of intermittent network connectivity.

The connection between the data acquisition service 116 and the historian 100 can also take any of a variety of forms. In an embodiment of the present invention, the physical connection comprises an intermittent or slow connection 118 that is potentially too slow to handle a burst of data, unavailable, or faulty. The data acquisition service 116 therefore includes components and logic for handling the stream of data from components connected to the plant floor network 101. In view of the potential throughput and connectivity limitations of connection 118, to the extent secondary information is to be generated or provided to clients of the historian 100 (e.g., HMI nodes 112), such information should be rendered after the data have traversed the connection 118. In an embodiment, the secondary information is rendered by advanced data retrieval operations incorporated into the historian 100.

Figure 2:
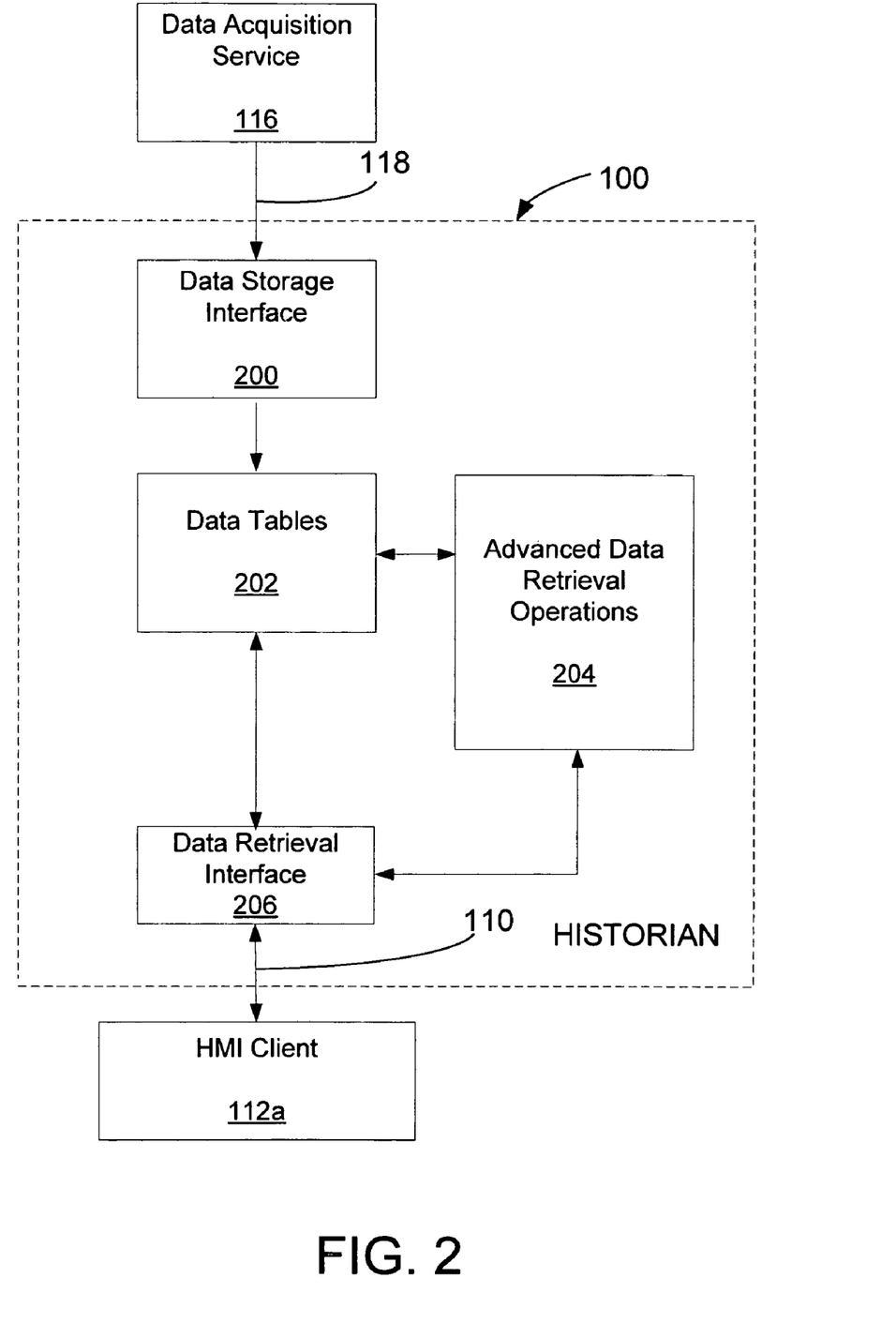
FIG. 2 is a schematic drawing of functional and structural aspects of a historian service embodying the present invention.

FIG. 2 depicts functional components associated with the historian 100. The historian 100 generally implements a storage interface 200 comprising a set of functions and operations for receiving and tabling data from the data acquisition service 116 via the connection 118. The received data are stored in one or more tables 202 maintained by the historian 100.

By way of example, the tables 202 include pieces of data received by the historian 100 via a data acquisition interface to a process control and production information network such as the data acquisition service 116 on network 101. In the illustrative embodiment each data piece is stored in the form of a value, a quality, and a timestamp. These three parts to each data piece stored in the tables 202 of the historian 100 are described briefly below.

Timestamp: The historian 100 tables data received from a variety of "real-time" data sources, including the I/O Servers 104 (via the data acquisition service 116). The historian 100 is also capable of accepting "old" data from sources such as text files. Traditionally, "real-time" data exclude data with timestamps outside of ±30 seconds of a current time of a clock maintained by a computer node hosting the historian 100. However, real-time data with a timestamp falling outside the 30-second window are addressable by a quality descriptor associated with the received data. Proper implementation of timestamps requires synchronization of the clocks utilized by the historian 100 and data sources.

Quality: The historian 100 supports two descriptors of data quality: "QualityDetail" and "Quality." The QualityDetail descriptor is based primarily on the quality of the data presented by the data source, while the Quality descriptor is a simple indicator of "good," "bad," or "doubtful," derived at retrieval time. Alternatively, the historian 100 supports an OPCQuality descriptor that is intended to be used as a sole data quality indicator that is fully compliant with OPC quality standards. In an alternative embodiment, the QualityDetail descriptor is utilized as an internal data quality indicator.

Value: A value part of a stored piece of data corresponds to a value of a received piece of data. In exceptional cases, the value obtained from a data source is translated into a NULL value at the highest retrieval layer to indicate a special event, such as a data source disconnection. This behavior is closely related to quality, and clients typically leverage knowledge of the rules governing the translation to indicate a lack of data, for example by showing a gap on a trend display.

The following is a brief description of the manner in which the historian 100 receives data from a real-time data source and stores the data as a timestamp, quality, and value combination in one or more of its tables 202. The historian 100 receives a data point for a particular tag (named data value) via the storage interface 200. The historian compares the timestamp on the received data to (1) a current time specified by a clock on the node that hosts the historian 100 and (2) a timestamp of a previous data point received for the tag. If the timestamp of the received data point is earlier than or equal to the current time on the historian node then:

If the timestamp on the received data point is later than the timestamp of the previous point received for the tag, the received point is tabled with the timestamp provided by the real-time data source.

If the time stamp on the received data point is earlier than the timestamp of the previous point received for the tag (i.e., the point is out of sequence), the received point is tabled with the timestamp of the previously tabled data point "plus 5 milliseconds." A special QualityDetail value is stored with the received point to indicate that it is out of sequence. (The original quality received from the data source is stored in the "quality" descriptor field for the stored data point.)

On the other hand, if the timestamp of the point is later than the current time on the historian 100's node (i.e., the point is in the future), the point is tabled with a time stamp equal to the current time of the historian 100's node. Furthermore, a special value is assigned to the QualityDetail descriptor for the received and tabled point value to indicate that its specified time was in the future. (The original quality received from the data source is stored in the "quality" descriptor field for the stored data point.)

The historian 100 can be configured to provide the timestamp for received data identified by a particular tag. After proper designation, the historian 100 recognizes that the tag identified by a received data point belongs to a set of tags for which the historian 100 supplies a timestamp. Thereafter, the time stamp of the point is replaced by the current time of the historian 100's node. A special QualityDetail value is stored for the stored point to indicate that it was timestamped by the historian 100. The original quality received from the data source is stored in the "quality" descriptor field for the stored data point.

It is further noted that the historian 100 supports application of a rate deadband filter to reject new data points for a particular tag where a value associated with the received point has not changed sufficiently from a previous stored value for the tag.

Having described a data storage interface for the historian 100, attention is directed to retrieving the stored data from the tables 202 of the historian 100. Access, by clients of the historian 100, to the stored contents of the tables 202 is facilitated by a retrieval interface 206. The retrieval interface 206 exposes a set of functions, operations, and methods (including a set of advanced data retrieval operations 204), callable by clients on the network 110 (e.g., HMI clients 112), for querying the contents of the tables 202. The advanced data retrieval operations 204 generate secondary information, on demand, by post-processing raw data stored in the tables 202. In response to receiving a query message identifying one of the advanced data retrieval options carried out by the operations 204, the retrieval interface 206 invokes the identified one of the set of advanced data retrieval operations 204 supported by the historian 100.

The plant historian 100 implements novel memory management techniques so that it can handle the enormous amount of data coming into it from the data sources 102. (The data coming in may be "indirect," such as, for example, the headers of history blocks. History blocks directly store data coming from the data sources 102, while the headers are created to manage the history blocks.) FIGS. 3 through 6 and the accompanying text illustrate some of these techniques. In this discussion, details of the data themselves are abstracted out in order to focus more particularly on the novel management techniques.

Figure 3:
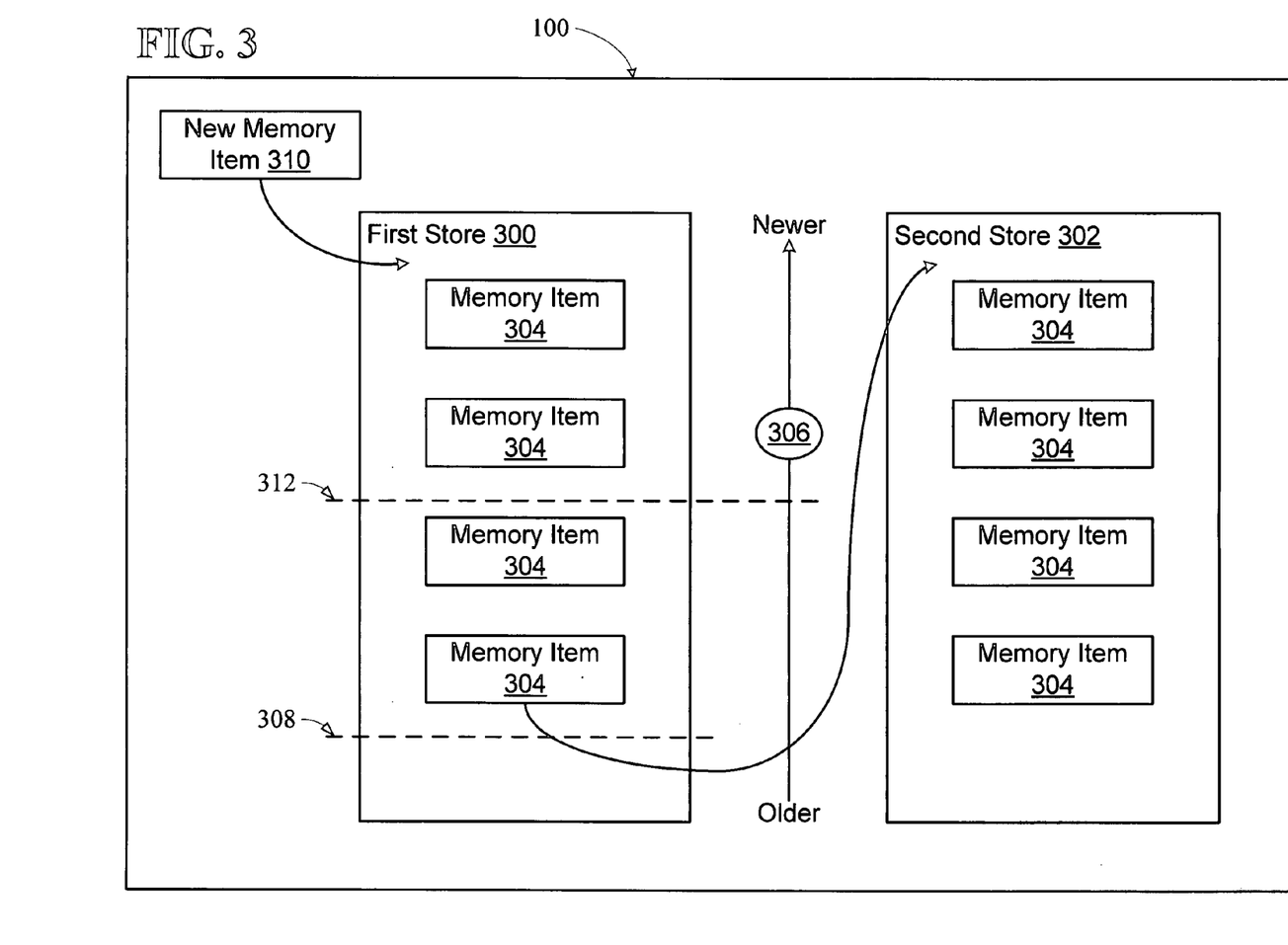
FIG. 3 is a schematic diagram of an exemplary history block storage mechanism managed by the historian.

FIG. 3 shows the plant historian 100 with two disk-based memory stores 300 and 302. The illustration is not meant to suggest that these two memory stores 300 and 302 must be located physically within the plant historian server 100, but rather shows that these stores are controlled by the plant historian 100. Some process control environments embody the present invention with only one memory store 300, while others may have more than the two illustrated in FIG. 3.

The two memory stores 300 and 302 contain, to be as general as possible, "memory items" 304. For example, these memory items 304 could be history blocks, one created each day, that capture the evolving status of the process control environment. Each of the memory items 304 contains (in addition to whatever else) creation (or storage) time information, as suggested by the timeline 306 ranking the memory items 304 from older to newer.

Figure 4:
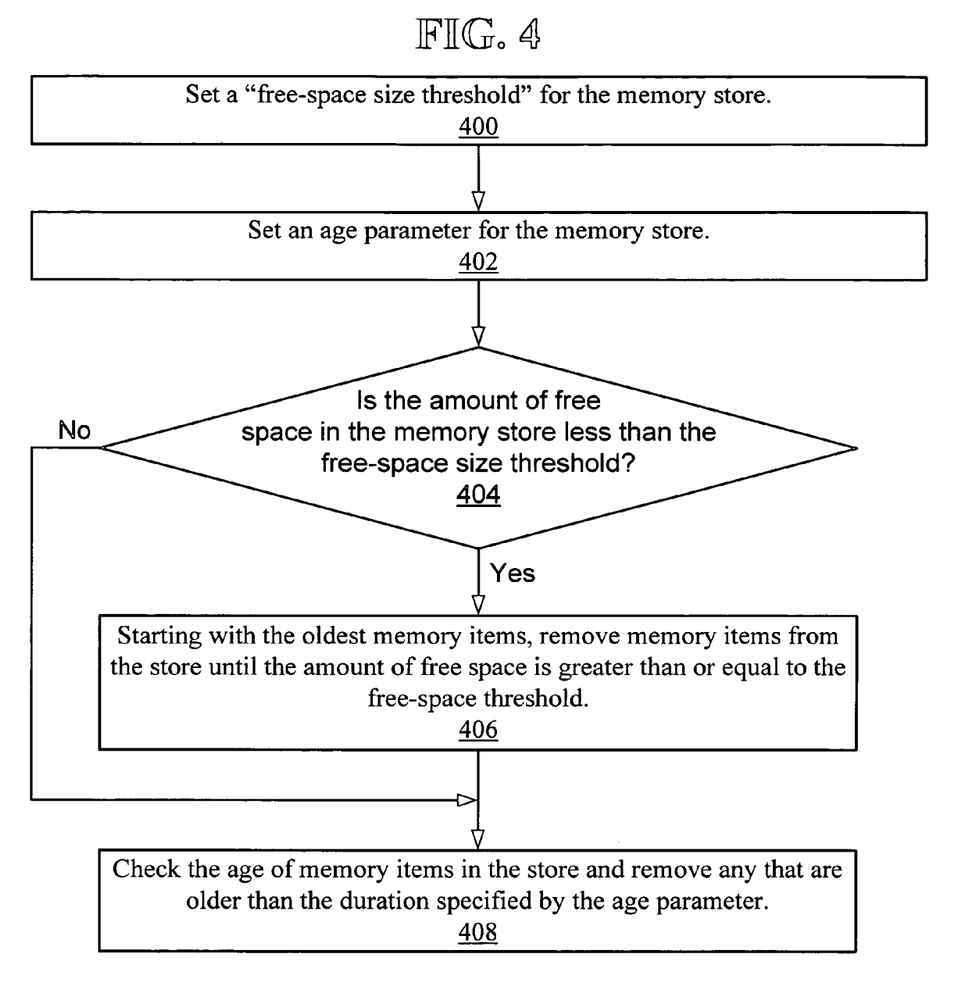
FIG. 4 is a flowchart of a technique for managing the storage of history blocks according to the present invention.

The remaining items in FIG. 3 are best illustrated in conjunction with FIG. 4. FIG. 4 presents the logic of a novel technique usable by the plant historian 100 to manage storage space requirements for the flood of memory items 304 coming into the memory stores 300 and 302. In step 400 of FIG. 4, a "free-space size threshold" is set. This threshold is shown by the dashed line 308 of FIG. 3. An age parameter is set in step 402 of FIG. 4 and is illustrated by the dashed line 312 of FIG. 3.

In step 404 of FIG. 4, the amount of free space in the memory store 300 is compared against the free-space size threshold 308. The amount of free space can decrease when, for example, a new memory item 310 is received for storage in the memory store 300. Considering FIG. 3, it is clear that if the new memory item 310 is added on "top" of the memory items 304, then the "lowest" (that is, the oldest) memory item 304 will be pushed down below the free-space size threshold 308. In some implementations, this may be acceptable in the short term, but an effort will be made to increase the amount of free space in the memory store 300. This effort is made in step 406 where memory items 304 are removed, oldest first, from the memory store 300 until the amount of free space is greater than the free-space size threshold 308.

As a complementary memory management technique, in step 408 the plant historian 100 periodically checks the age of its memory items 304 against the age parameter 312. Any memory items 304 older than this (as are two in FIG. 3) are removed.

In those implementations with multiple memory stores, the memory items 304 removed from the first memory store 300 are moved to the second memory store 302. In this "chain" of memory stores, the first memory store 300 can be on a very fast, but expensive and space-limited, disk drive. Additional memory stores can be slower and less expensive. This chain is cheaper and potentially more reliable than having a single, very large memory store, while allowing the first memory store 300 to be as fast as possible to support human interactions and critical control processes.

The second memory store 302 (and any subsequent ones) can implement the same memory management techniques described above for the first memory store 300 or can implement other techniques.

Figure 5:
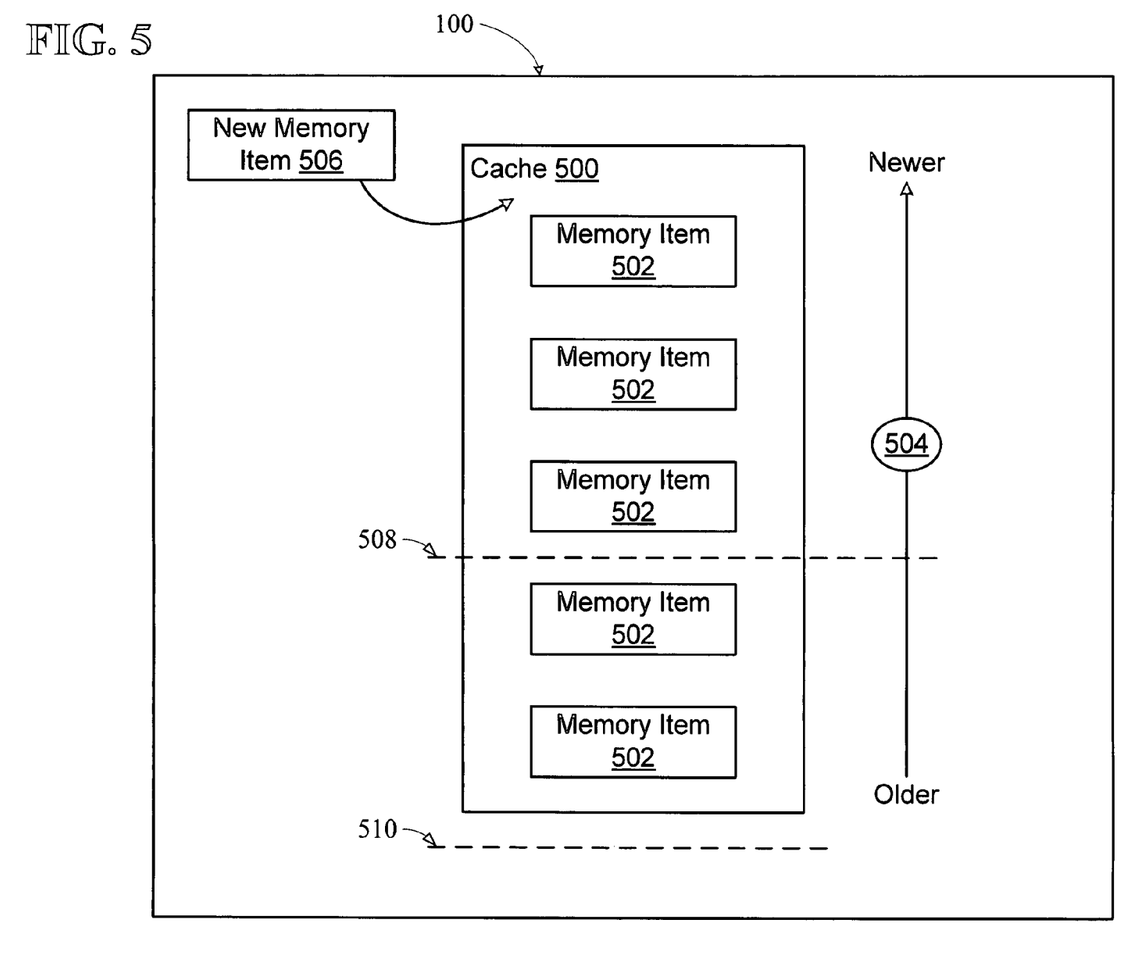
FIG. 5 is a schematic diagram of an exemplary cache memory mechanism managed by the historian.
Figure 6:
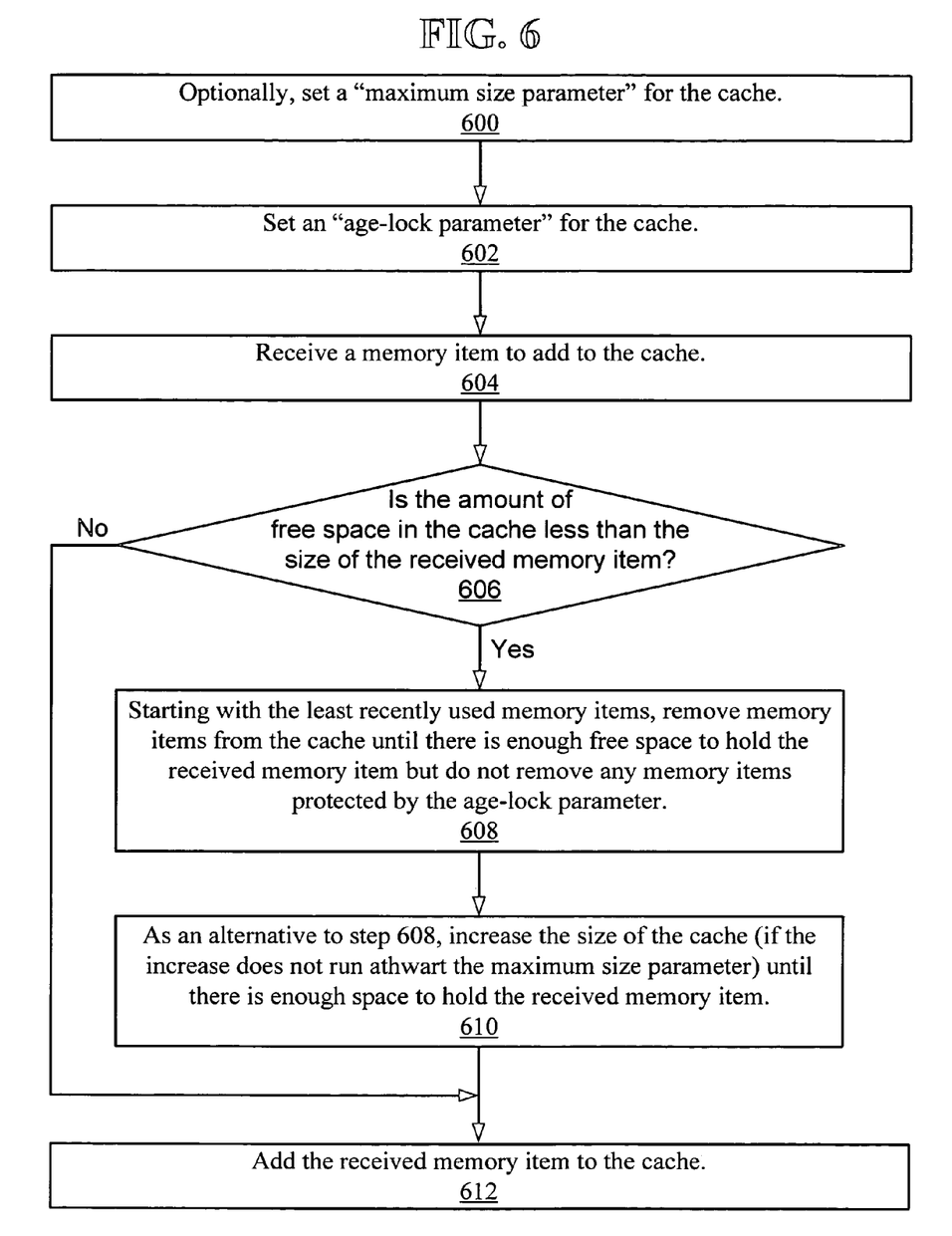
FIG. 6 is a flowchart of a technique for managing a cache memory according to the present invention.

FIGS. 5 and 6 together illustrate another memory management technique usable by the plant historian 100. Rather than the disk-based memory stores 300 and 302 of FIG. 3, the cache 500 of FIG. 5 is RAM-based. This fact and the fact that all of the memory items 502 in the cache 500 are reproduced elsewhere (such as on disk) present the need and the opportunity for a different memory management technique.

Instead of being of a fixed size, the cache 500 can grow ("downward" in FIG. 5) when necessary. Limiting this growth is a "maximum size parameter" set for the cache 500 in step 600 of FIG. 6 and illustrated in FIG. 5 by the dashed line 510.

Because the cache 500 is used to provide fast retrieval of its memory items 502, some of those memory items 502 can be "locked" in the cache. The "age-lock parameter," set in step 602 of FIG. 6 and illustrated by the dashed line 508 of FIG. 5, implements this locking as discussed below.

When a new memory item 506, such as a history block header, is to be added to the cache 500, the size of this new item 506 is compared against the amount of free space in the cache 500 (step 606). If the amount of free space is insufficient, then the two management techniques of steps 608 and 610 come into play. Free space is created in step 608 by removing memory items 502 from the cache 500. Memory items 502 can be selected for removal via the well known "least recently used" algorithm. However, no items newer than the age-lock parameter 508 are allowed to be removed. Alternatively, in step 610, free space is created simply by increasing the size of the cache 500, subject to the maximum size parameter 510.

It may happen that steps 608 and 610, either separately or in conjunction, cannot provide enough free space for the new memory item 506. For example, the age-lock parameter 508 can be set to lock so many memory items 502 that the cache 500 runs into the maximum size parameter 510. In this case, a compromise is reached by either discarding a memory item 502 otherwise protected by the age-lock parameter 508 or by allowing the cache 500 to expand beyond the maximum size parameter 510.

In any case, the new memory item 506 is added to the now sufficient free space in step 612 of FIG. 6.

In view of the many possible embodiments to which the principles of the present invention may be applied, it should be recognized that the embodiments described herein with respect to the drawing figures are meant to be illustrative only and should not be taken as limiting the scope of the invention. Those of skill in the art will recognize that some implementation details are determined by specific situations. Although the environment of the invention is described in terms of software modules stored on a physical computer readable medium or components, some processes may be equivalently performed by hardware components. Therefore, the invention as described herein contemplates all such embodiments as may come within the scope of the following claims and equivalents thereof.

We claim:

1. In a control environment, a method for managing at least one store of memory items from the control environment, the method comprising:

setting a free-space size threshold for the store;

setting an age parameter for the store, the age parameter specifying a duration;

comparing an amount of free space in the store with the free-space size threshold;

if the amount of free space in the store is less than the free-space size threshold, then selecting and removing memory items from the store and marking as free the space previously occupied by the removed memory items until the amount of free space in the store is greater than or equal to the free-space size threshold;

comparing an age of a memory item in the store with the duration specified by the age parameter; and if the memory item is older than the duration specified by the age parameter, then removing the memory item from the store;

wherein the memory items comprise history blocks comprising data from the control environment.

2. The method of claim 1 wherein comparing an amount of free space in the store with the free-space size threshold comprises running a periodic scan of the store.

3. The method of claim 1 wherein selecting memory items to be removed comprises selecting the oldest memory items in the store.

4. The method of claim 1 wherein removing memory items in the store comprises adding the removed memory items to a second store.

5. The method of claim 1 wherein comparing an age of a memory item in the store with the duration specified by the age parameter comprises scanning the store for memory items older than the duration specified by the age parameter.

6. A computer-readable medium having computer-executable instructions for performing a method for managing at least one store of memory items from a control environment, the method comprising:

setting a free-space size threshold for the store;

setting an age parameter for the store, the age parameter specifying a duration;

comparing an amount of free space in the store with the free-space size threshold;

if the amount of free space in the store is less than the free-space size threshold, then selecting and removing memory items from the store and marking as free the space previously occupied by the removed memory items until the amount of free space in the store is greater than or equal to the free-space size threshold;

comparing an age of a memory item in the store with the duration specified by the age parameter; and if the memory item is older than the duration specified by the age parameter, then removing the memory item from the store;

wherein the memory items comprise history blocks comprising data from the control environment.

7. The computer-readable medium of claim 6 wherein comparing an amount of free space in the store with the free-space size threshold comprises running a periodic scan of the store.

8. The computer-readable medium of claim 6 wherein selecting memory items to be removed comprises selecting the oldest memory items in the store.

9. The computer-readable medium of claim 6 wherein removing memory items in the store comprises adding the removed memory items to a second store.

10. The computer-readable medium of claim 6 wherein comparing an age of a memory item in the store with the duration specified by the age parameter comprises scanning the store for memory items older than the duration specified by the age parameter.

11. In a control environment, a system for managing memory items from the control environment, the system comprising:

the memory items, wherein the memory items comprise history blocks comprising data from the control environment;

at least one store configured for storing the memory items;

a free-space size threshold for the store; and an age parameter for the store, the age parameter specifying a duration;

wherein the store is further configured for:

comparing an amount of free space in the store with the free-space size threshold;

if the amount of free space in the store is less than the free-space size threshold, then selecting and removing memory items from the store and marking as free the space previously occupied by the removed memory items until the amount of free space in the store is greater than or equal to the free-space size threshold;

comparing an age of a memory item in the store with the duration specified by the age parameter; and if the memory item is older than the duration specified by the age parameter, then removing the memory item from the store.

12. The system of claim 11 wherein comparing an amount of free space in the store with the free-space size threshold comprises running a periodic scan of the store.

13. The system of claim 11 wherein selecting memory items to be removed comprises selecting the oldest memory items in the store.

14. The system of claim 11 wherein removing memory items in the store comprises adding the removed memory items to a second store.

15. The system of claim 11 wherein comparing an age of a memory item in the store with the duration specified by the age parameter comprises scanning the store for memory items older than the duration specified by the age parameter.

16. The system of claim 11 wherein the memory items comprise process control information rendered by a process control system.

17. The system of claim 11 wherein the age of the memory item corresponds to a time of creation of the memory item in the control environment.

* * * * *

UNITED STATES PATENT AND TRADEMARK OFFICE
CERTIFICATE OF CORRECTION

PATENT NO. : 7,574,569 B2  Page 1 of 1
APPLICATION NO. : 11/189651
DATED : August 11, 2009
INVENTOR(S) : Avergun et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 375 days.

Signed and Sealed this

Seventh Day of September, 2010

David J. Kappos
*Director of the United States Patent and Trademark Office*